United States Patent Office 3,394,135
Patented July 23, 1968

3,394,135
PRODUCTION OF CYANURIC ACID
William P. Moore, Chester, and Joseph A. Smith, Richmond, Va., assignors to Allied Chemical Corporation, New York, N.Y., a corporation of New York
No Drawing. Filed Dec. 9, 1965, Ser. No. 512,802
14 Claims. (Cl. 260—248)

ABSTRACT OF THE DISCLOSURE

An improved process for producing cyanuric acid from urea wherein an inert liquid media is not required and caking, sticking or balling is substantially eliminated. The process is concerned with heating pellets of urea in admixture with finely divided melamine cyanurate to produce pellets comprising urea and melamine cyanurate, the urea-melamine cyanurate pellets being heated at a temperature sufficient to convert the urea to cyanuric acid.

---

This invention relates to the production of cyanuric acid and, more particularly, to an improved process for producing cyanuric acid from urea.

Numerous methods have been proposed for the production of cyanuric acid from urea. These methods fall into four general categories which may be designated as follows: pyrolysis of urea in the presence of zinc chloride or ammonium chloride, pyrolysis of urea in organic solvents, pyrolysis of urea in a granulator type operation and pyrolysis of urea cyanurate.

The earliest methods for producing cyanuric acid from urea involved heating the urea to temperatures above 180° C. at superatmospheric pressures. The tendency of the urea to breakdown into ammonia and carbon dioxide or polymerize to ammelide and ammeline was somewhat reduced by the inclusion of a compound such as ammonium chloride or zinc chloride. Nevertheless, this process was found to be accompanied by severe operational difficulties due to the build-up of solids on the inner wall of the synthesis vessel, which reduced heat transfer efficiency and required frequent interruption of the operation to permit its removal.

The conversion of urea to cyanuric acid in organic heat transfer media, such as hydrocarbon oils, is troubled by the same difficulties as the direct pyrolysis of urea. Solids build-up on the inner wall of the synthesis vessel while less severe, is none-the-less a problem. In addition, product obtained by this method is often discolored, and loss of the heat transfer media, particularly when glycols and glycol ethers are used, greatly increases the expense of this type of operation.

A more recent development is the so-called "granulator process." In this process urea is converted to a reaction product consisting largely of cyanuric acid and ammelide by heating a mass of urea, preferably urea coated on solid particles of cyanuric acid, to a temperature of 240 to 350° C. at such a rate that urea is molten and de-ammoniated through a viscous plastic state to a hard, solid state, while continuously tumbling the reaction mass at a rate of speed that allows the material to convert largely into free-flowing granules of crude cyanuric acid and ammelide. While this process exhibits many advantages over those previously described, it is accompanied by several disadvantages. The rate of tumbling, the rate of heating and the reactor retension time must be held in close control to prevent the viscous, plastic material from caking on the walls of the reactor and to prevent the formation of very large lumps. Another difficulty is the high loss caused by the tendency of urea or ammonium cyanate to vaporize and be carried along by hot gases, mainly ammonia, emitted from the reaction mass. A portion of the urea vapor carried off is actually pyrolyzed to cyanuric acid and forms a smoke of extremely fine particles which is difficult to recover by any normal means. This smoke loss can amount to as much as 40% of the urea fed to the reactor.

Belgian Patent 627,060 discloses the preparation of cyanuric acid from urea cyanurate. In accordance with one method disclosed in this patent, aqueous urea and cyanuric acid are heated to boiling and the urea cyanurate which precipitates therefrom upon cooling is separated, and can be subsequently converted to cyanuric acid by heating to temperatures of 180° C. or higher. This method calls for the recycling of one mole of cyanuric acid for each mol of urea which is to be converted to additional cyanuric acid. In accordance with another method disclosed in this patent, solid particulate cyanuric acid is admixed with urea and heated to temperatures of 180° C. to 320° C. at atmospheric pressure. The urea coats the cyanuric acid and reacts with it to form urea cyanurate which then converts to cyanuric acid. However, when operating in accordance with this process a large excess of cyanuric acid, for example a ratio of cyanuric acid to urea of at least 10:1 and preferably 43:1 or 52:1 is used. The necessity of recycling such large amounts of cyanuric acid results in a tremendous throughput of material and consequent large apparatus and power requirements.

It is, therefore, an object of this invention to provide an improved method for producing cyanuric acid from urea.

It is further an object of this invention to produce cyanuric acid from urea by a method which does not require inert liquid media and can be carried out in the substantial absence of caking, sticking or balling.

The foregoing objects and others which will be made obvious hereinafter are achieved by a process which, in its broadest sense comprises heating pelleted urea in admixture with finely divided melamine cyanurate to convert the urea to cyanuric acid.

More particularly, the process of the present invention comprises heating pellets of urea in admixture with finely divided melamine cyanurate to produce pellets comprising urea and melamine cyanurate and heating the urea-melamine cyanurate pellets at a temperature sufficient to convert the urea to cyanuric acid.

Although, for convenience, the pelleted starting material will be referred to throughout this disclosure and in the appended claims as "urea," it is to be understood that said "urea" pellets may contain up to 50%, by weight, biuret.

The size of the urea pellets is not critical and, although 4 to 20 U.S. mesh pellets are preferred, the process of the invention can be operated successfully with urea pellets over an inch in diameter. However, uniformity of size is desirable, and when using 8 to 20 U.S. mesh pellets, as is the usual case, preferably no more than about 8% of the urea pellets should be outside this range.

The melamine cyanurate can be prepared by various methods which comprise heating melamine in the presence of cyanuric acid. Preferably cyanuric acid is added to aqueous melamine and heated to 30° to 160° C., for 5 to 30 minutes. Precipitation of melamine cyanurate is complete as long as one mol of cyanuric acid per mol of melamine is available. A moderate excess of cyanurate acid can be used, but too great an excess means a high cyanuric acid recycle burden. The full advantage of this invention is obtained when the aqueous melamine is the waste stream from a melamine purification operation. The melamine cyanurate is ground, if necessary, to the proper size.

The relative size of the urea pellets and melamine cyanurate particles should be such as to provide a uniform coating of the melamine cyanurate on the urea. With 4 to 20 U.S. mesh urea pellets, good results are obtained when substantially all the finely ground melamine cyanurate is smaller than 35 U.S. mesh. Preferably, no more than 8% should be larger than 40 mesh, the bulk of it being between 60 and 325 mesh. When the major portion of the urea pellets are not sufficiently larger in dimension than the major portion of the melamine cyanurate particles, insufficient coating and non-uniform product is obtained and increased loss due to volatilization of urea is encountered. Best results are obtained when the diameter of urea pebbles is about 10 to 20 times the longest dimension of the melamine cyanurate particles.

The urea and melamine cyanurate can be fed separately into a heater, but it is preferred to mix these materials prior to their introduction into the heater. When the urea and melamine cyanurate are premixed, even at temperatures as low as 30° C., some melamine cyanurate adheres to the urea pellet. It is desirable to have a coating on the urea pellet before it is subjected to the elevated temperatures, in order to avoid volatilization of urea and/or solids build-up on the walls of the heater.

Sufficient melamine cyanurate should be used to provide a coating on each urea pellet. This is not to say that the urea pellets are completely enclosed by the melamine cyanurate. The coating is discontinuous, in that there are sufficient interstices to allow escape of ammonia which evolves during the process and also migration of urea. A weight ratio of melamine cyanurate to urea of at least about 0.7:1 should be used, and preferably about 1.4 to 1.8 parts by weight melamine cyanurate are used per part of urea. Excessive amounts of melamine cyanurate are not detrimental to the process, but are less economical, because larger amounts of cyanuric acid must be returned to the system in a continuous operation, to provide the necessary cyanurate. A suitable maximum cyanurate:urea weight ratio is about 2:1. It can be seen from the above ratios that the present invention can be carried out with considerably less return of cyanuric acid than in previously devised "cyanurate" processes.

While finely ground melamine cyanurate alone may be used, the presence in the finely ground material of up to about 20% by weight thereof of ammelide or ammeline is not objectionable. Ammelide and/or ammeline may constitute a part of the cyanuric acid which is used to make the melamine cyanurate, or it may constitute part of the effluent from a melamine purification system. These materials are almost completely inert under the conditions of the cyanuric synthesis reaction, but can be hydrolyzed with strong acid to cyanuric acid. It will be understood that the term "melamine cyanurate" used herein includes that containing up to 20% ammelide and/or ammeline.

The temperature of the heater, preferably a rotary drum type heater, into which the urea and melamine cyanurate are fed, is maintained at its inlet end below that at which rapid melting of the urea occurs, preferably no higher than about 160° C. Preferably the temperature in this heater which is sometimes referred to as the "coater-pebbler" is no higher than about 180° C. throughout. It has been found that when these temperatures are exceeded the melamine cyanurate is unsatisfactory, the shells tend to rupture, and caking occurs. Preferably the heater is maintained at a temperature of about 130° C. at its inlet end up to about 160° C. at its hottest point.

Satisfactory development of the melamine cyanurate-urea is achieved when the rate of rotation of the coater-pebbler is maintained between 10 and 75 r.p.m. Of course, this may be varied slightly, depending on the size of the vessel and its loading.

Pressure in the heater is not critical, and atmospheric pressure is conveniently employed.

While the pellets may be formed in batches, it is preferable to operate a continuous process which involves continuously feeding the urea and melamine cyanurate into the heater and causing it to pass continuously through the heater with a retention time of at least 5 minutes, about 15 to 60 minutes being required under preferred heating conditions.

The product exiting the heater is in the form of pellets comprised of melamine cyanurate and urea, each having an external diameter about 20 to about 50%, usually about 30 to 35%, greater than the diameter of the urea pellet used in its production. When produced in a rotary heater, in accordance with the preferred mode of carrying out this invention, the urea appears to be adsorbed into the melamine cyanurate coating and the pellets are hollow pellets having a wall thickness equal to about 10% to 40%, usually 20%–25%, of the diameter of the urea pellet and an interior void having a diameter equal to about 40% to 80%, usually 60%–65%, of the diameter of the urea pellet. Expressed another way, the hollow melamine cyanurate-urea pellets have an internal diameter about 1 to about 8 times their wall thickness, and usually about 2 to 3 times their wall thickness. These relative dimensions are, to a certain extent, dependent upon the size and capacity of the rotating vessel, since the density of the wall and the amount of material abraded therefrom will be determined by the opportunity one pellet has for coming into contact with others.

The melamine cyanurate-urea product may be cooled and stored prior to being used in the production of cyanuric acid, but preferably it is continuously and directly fed to a cyanuric acid reactor for conversion of the urea to cyanuric acid.

The temperature in the cyanuric acid reactor is maintained sufficiently high to convert the urea to cyanuric acid, usually about 230° to 320° C., preferably 285° to 310° C. This reactor, which is preferably a rotary vessel, is preferably maintained at pressures in the range of 300 to 700 mm. Hg absolute. This use of sub-atmospheric pressure is desirable because the production of cyanuric acid is most efficient when the liberated ammonia gas is swiftly removed from the reaction mixture. With the hollow pebbles, operation at such reduced pressures is effective and, unlike prior art methods, there is little or no loss of urea by vaporization. Moreover, because the pebbles are free-flowing they can be fed easily through a conventional air-lock such as a star feeder. Atmospheric pressure and pressure above atmospheric can also be employed, but the use of these higher pressures inhibits the removal of ammonia and promotes the formation of ammelide and ammeline.

Speed of rotation of the cyanuric acid reactor is somewhat dependent on its diameter and loading and normally is at least about 5 r.p.m. and not above about 30 r.p.m.

Retention time of the reactants in the cyanuric acid reactor is about 15 to 150 minutes, preferably about 20 to 60 minutes. Conversion of the urea to cyanuric acid or to materials readily hydrolyzed to cyanuric acid is substantially complete. The melamine cyanurate and any ammelide or ammeline present appear to remain substantially unchanged.

The material exiting the cyanuric acid reactor, which is in the form of hollow pellets when the hollow urea-melamine cyanurate pellets are used as reactor feed, is comprised of cyanuric acid, melamine cyanurate and possibly ammelide or ammeline, in proportions which depend on the amount of starting materials. About 50 to 75% preferably is returned for additional melamine cyanurate production. The remaining portion can be stored for later use, but usually is subjected to purification by acid hydrolysis, as described below.

The crude melamine cyanurate-cyanuric acid-ammelide product is mixed with 10–40% aqueous strong acid, preferably nitric acid, and pumped to a pressure digester operating at about 120° to 185° C., preferably 130–145° C., at autogenous pressure. Solution retention time in the digester is 0.5 to 10 hours, preferably 2–4 hours. It is important that the digestion be carried out at elevated temperatures and pressures. Melamine cyanurate hydrolyzes very slowly at 100° C., for example. It is also highly desirable that agitation be provided so that the acid may reach all parts of the very insoluble melamine cyanurate. The acid concentration used should be relatively high to assure rapid hydrolysis of melamine tied up as melamine cyanurate. It is preferable to have two mols $HNO_3$ per mol hydrolyzable nitrogen in the melamine present.

The slurry from digestion is cooled in a flash cooler-crystallizer, operating at about 25° to 60° C., preferably 35° to 40° C., centrifuged and washed to recover damp cyanuric acid. A portion of the centrifugate is normally recycled to the feed tank to minimize losses of nitric acid. The damp cyanuric acid is dried in a continuous rotary dryer to give a pure, white cyanuric acid product.

The foregoing process provides several advantages, some of which are discussed below.

The loss of urea or cyanuric acid during pyrolysis is essentially eliminated because the melamine cyanurate shell around each urea pebble provides, in effect, a scrubbing device which removes from the evolved ammonia any urea or cyanic acid. Unconverted urea within the pellets is at all times protected by the shells, so that the vaporizing effect of gases present in the reactors is minimized. Accordingly, exceptionally good yields of cyanuric acid are obtained, based on the amount of urea feed, in addition to the significant amount of cyanuric acid which are obtained from the melamine and ammelide or ammeline, by hydrolysis.

Another advantage of this process is that the hollow pellets are quite hard, strong and refractory and dust losses in the cyanuric acid reactor or during subsequent handling are substantially eliminated.

A further advantage is that cyanuric acid can be continuously produced from urea using a cyanuric acid:urea mol ratio sufficiently low so that no substantial recycle burden is involved. A still further advantage is that use can be made of melamine contained in the waste effluent from a melamine purification system.

In addition, observation of this process has revealed no visible viscous plastic phase, and substantially no caking or sticking and no balling apart from accretion of melamine cyanurate to the pellets entering the first heater.

When the urea-melamine cyanurate pellets are subsequently heated in the cyanuric acid reactor, ammonia is evolved as part of the reaction by which cyanuric acid is formed. This ammonia apparently passes through interstices in the cyanurate shell. Any urea still present in the pellet converts to cyanuric acid, and there is no tendency to stick, cake or ball.

In the following examples which illustrate preferred modes of carrying out the present invention but are not intended to limit it, parts are in pounds per hour and temperatures are in degrees centigrade, unless otherwise specified.

Example I

Waste stream from melamine synthesis is concentrated to give a slurry with the following composition:

| Component: | Wt., percent |
|---|---|
| Melamine | 6.5 |
| Ammelide | 2.3 |
| Other | 1.2 |
| Water | 90.0 |
| Total | 100.0 |

620.1 parts of this slurry is pumped to a melamine cyanurate reactor along with 181.3 parts of recycled crude cyanuric acid described hereinafter. The melamine cyanurate reactor is operated at 85° C., and atmospheric pressure with strong agitation and 20 minutes average retention time. Reaction is complete to give 801.4 parts of reactor effluent having the following composition:

| Component: | Wt., percent |
|---|---|
| Melamine cyanurate | 24.4 |
| Ammelide | 5.1 |
| Other | 0.9 |
| Water | 69.6 |
| Total | 100.0 |

The reactor effluent is centrifuged to give 548.1 parts of centrifugate which are discarded and 253.3 parts of damp solids having the following composition:

| Component: | Wt., percent |
|---|---|
| Melamine cyanurate | 76.2 |
| Ammelide | 15.0 |
| Other | 0.1 |
| Water | 8.7 |
| Total | 100.0 |

The damp solids are passed to a rotary dryer where 21.9 parts of water vapor are removed. The dry crude melamine cyanurate is ground to give 231.4 parts of fine material (80% through 100 U.S. mesh). The crude melamine cyanurate is mixed with 112.0 parts commercial 8–12 U.S. mesh pebbled urea and the resulting mixture is fed to a feed pebbler, which is a rotary gas fired oven with a solids retention time of 20 minutes, having temperatures ranging from 30° C. at its inlet to 140° C. at its discharge. The pebbles of urea are coated with ground melamine cyanurate containing ammelide and the urea moves to the coating or shell to form hollow pebbles. The effluent from the feed pebbler, amounting to 343.4 parts is continuously discharged to a cyanuric acid reactor with the following composition:

| Component: | Wt. percent |
|---|---|
| Melamine cyanurate | 56.2 |
| Ammelide | 11.1 |
| Urea | 32.6 |
| Other | 0.1 |
| Total | 100.0 |

The cyanuric acid reactor consists of an externally fired rotary stainless steel oven with ends closed by airtight coverings fitted with a vent. Temperature of the reactants in the cyanuric acid reactor increases from 230° C. near the inlet end of the reactor to 300° C. at the exit end. Solids retention time in the reactor averages 30 minutes. Desorbed gas amounting to 32.1 parts is vented off and 311.3 parts crude cyanuric acid product are discharged with the following composition:

| Component: | Wt. percent |
|---|---|
| Melamine cyanurate | 62.3 |
| Ammelide | 14.4 |
| Cyanuric acid | 23.3 |
| Total | 100.0 |

181.3 parts of this crude product are returned to react with more concentrated melamine plant waste and the remaining 130.0 parts are discharged to storage and then to a purification feed tank where it is slurried with a mixture comprising 497.9 parts of fresh 25.4% aqueous nitric acid and 845.9 parts of recycled centrifugate having the following composition:

| Component: | Wt. percent |
|---|---|
| $HNO_3$ | 13.5 |
| $NH_4NO_3$ | 22.1 |
| $H_2O$ | 63.7 |
| Cyanuric acid | 0.7 |
| Total | 100.0 |

The crude product-acid slurry is pumped through two stirred digesters operating in series at 140° C. and 40 p.s.i.g. pressure with a total retention time of 4 hours. Melamine cyanurate and ammelide are converted to cyanuric acid. The hot slurry is pumped to a vacuum flash cooler operating at 35° C. Vapor amounting to 98.0 parts is discharged and product slurry amounting to 1376.9 parts is sent to the cyanuric acid centrifuge with the following composition:

| Component: | Wt. percent |
|---|---|
| Cyanuric acid | 10.0 |
| Ammelide | Trace |
| $NH_4NO_3$ | 20.0 |
| $HNO_3$ | 12.2 |
| $H_2O$ | 57.7 |
| Total | 99.9 |

The cooled slurry is centrifuged, and 1227.1 parts centrifugate are removed. A bleed of 381.2 parts is taken from the centrifuge and the remainder is returned to the purification feed tank. The wet solids are washed with 300 parts water and centrifuged again. Centrifugate amounts to 308.6 parts and is discarded.

A total of 141.2 parts of damp purified cyanuric acid is discharged from the centrifuge into a rotary type cyanuric acid dryer. 13.8 parts of vapor are discharged. Composition of the purified product is as follows:

| Component: | Wt. percent |
|---|---|
| Cyanuric acid | 99.8 |
| $NH_4NO_3$ | 0.1 |
| Ammelide | Trace |
| $H_2O$ | 0.1 |
| Total | 100.0 |

The product is white and free flowing. The *overall* use of raw materials per pound of purified cyanuric acid is as follows: urea, 0.88 lb., melamine plant waste solids, 0.43 lb. and $HNO_3$, 0.99 lb.

Example II

Commercial pebbled urea (4–10 U.S. mesh) and ground melamine cyanurate were mixed to give the following composition:

| Component: | Wt. percent |
|---|---|
| Melamine cyanurate | 59.3 |
| Melamine | 0.7 |
| Urea | 40.0 |
| Total | 100.0 |

Two hundred grams of this mixture were placed in a 1-liter Morton flask and the flask was placed in a silicone oil bath, rotating along its horizontal axis at 100 r.p.m. Heat was applied to bring flask temperature to 135° C. where it was held for 1 hour. Temperature was then increased to 270° C. and rotation was continued for 1 hour under a slight vacuum to facilitate removal of desorbed gases. Hard, dust-free, refractory, hollow pebbles of product was produced with the particles very uniform in size. The flask and vapor lines remained clean and there was no evidence at all of a viscous plastic stage. A total of 168.9 grams of crude were discharged with the following composition:

| Component: | Wt. percent |
|---|---|
| Melamine cyanurate | 70.2 |
| Melamine | 0.8 |
| Ammelide | 3.0 |
| Cyanuric acid | 26.0 |
| Total | 100.0 |

The crude product was charged to a 2-liter stainless steel autoclave fitted with turbine type agitator containing 980 ml. of 40% aqueous nitric acid. The mixture was heated to 140° C. under autogenous pressure and agitated for 2 hours. The autoclave was cooled, depressurized and its contents discharged, filtered, washed with water and dried. The dry filtered product weighed 161.2 grams and assayed 99.7% cyanuric acid. Analysis of the filtrate showed another 4.0 grams cyanuric acid. Disregarding the filtrate the amount of cyanuric acid produced was considerably greater than theory based on urea fed.

This example demonstrates the improvement that melamine cyanurate allows in the practical operation of the synthesis of cyanuric acid, particularly in regard to the use of higher urea concentrations. The example also demonstrates operation with slight excess of melamine.

It can thus be seen that a novel and useful process has been devised for producing cyanuric acid from urea, which process also makes good use of melamine and particularly melamine contained in the waste effluent from a melamine purification system. While certain preferred features have been emphasized, it will be readily seen that various modifications can be made without departing from the scope of the present invention. For example, while it is preferable, particularly on a continuous commercial scale, to use separate reactors for the formation of the hollow pellets and the synthesis of cyanuric acid, it is possible, to carry out both of these steps in a single vessel heated to successively higher temperatures, as shown in Example 2, or by using a long vessel in which the temperature of the materials is gradually increased from the relatively low initial temperatures to the higher synthesis temperatures. Also, the crude cyanuric acid may be finely divided before being subjected to the purification. Another possible variation is to recycle a portion of the purified cyanuric acid to the aqueous melamine rather than recycling crude cyanuric acid.

We claim:
1. A process for producing cyanuric acid which comprises heating pelleted urea in admixture with finely divided melamine cyanurate to convert the urea to cyanuric acid.

2. A process for producing cyanuric acid which comprises heating a mixture of finely divided melamine cyanurate and pellets of urea to produce pellets comprising melamine cyanurate and urea and heating said urea-melamie cyanurate pellets at a temperature sufficient to convert the urea to cyanuric acid.

3. The process of claim 2 wherein the first heating is carried out in a rotary drum and the urea-melamine cyanurate pellets are hollow.

4. The process of claim 2 wherein the product is digested in aqueous strong acid.

5. The process of claim 2 wherein the weight ratio of melamine cyanurate to pellets is at least about 0.7:1.

6. The process of claim 2 wherein the heating steps are carried out at temperatures in the range 125° to 180° C. and 230° C. to 320° C., respectively.

7. The process of claim 2 wherein the melamine cyanurate contains about 5% to about 20% by weight of ammelide, ammeline or a mixture thereof.

8. The process of claim 2 wherein the urea pellets are of a mesh size within the range of 4 to 20 U.S. mesh and substantially all the melamine cyanurate is finer than 35 U.S. mesh.

9. The process of claim 4 in which the digestion is carried out at 120° to 185° C. and at elevated pressure.

10. The process of claim 4 wherein the strong acid is nitric acid.

11. A process for producing cyanuric acid which comprises heating cyanuric acid in aqueous melamine to produce melamine cyanurate, separating said melamine cyanurate from the aqueous medium, admixing it in finely divided form with pellets of urea, in a weight ratio of 0.7 to 2 parts cyanurate per part pellets, heating the resulting mixture to a temperature of 125° to 180° C. while repeatedly and substantially continuously bringing said pellets into contact with finely divided melamine cyanurate so as to coat the urea pellets and produce hollow pellets comprising melamine cyanurate and urea, heating said hollow pellets at a temperature in the range 230° to 320° C. to convert them to hollow pellets comprising melamine cyanurate and cyanuric acid and digesting the melamine cyanurate-cyanuric acid product in aqueous strong acid to hydrolyze melamine to cyanuric acid.

12. The process of claim 11 wherein the aqueous melamine and cyanuric acid are heated to a temperature in the range 30° to 160° C.

13. The process of claim 11 wherein the aqueous melamine is the waste stream from a melamine purification operation.

14. The process of claim 11 wherein a portion of the hollow pellets comprising melamine cyanurate and cyanuric acid is returned to react with additional aqueous melamine.

References Cited

UNITED STATES PATENTS

| | | | |
|---|---|---|---|
| 2,999,093 | 9/1961 | Christian | 260—248 |
| 3,318,887 | 5/1967 | Moore et al. | 260—248 |

JOHN D. RANDOLPH, *Primary Examiner.*

J. M. FORD, *Assistant Examiner.*